United States Patent Office 3,453,930
Patented July 8, 1969

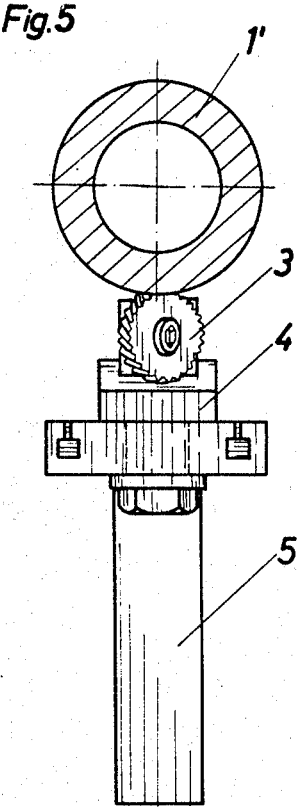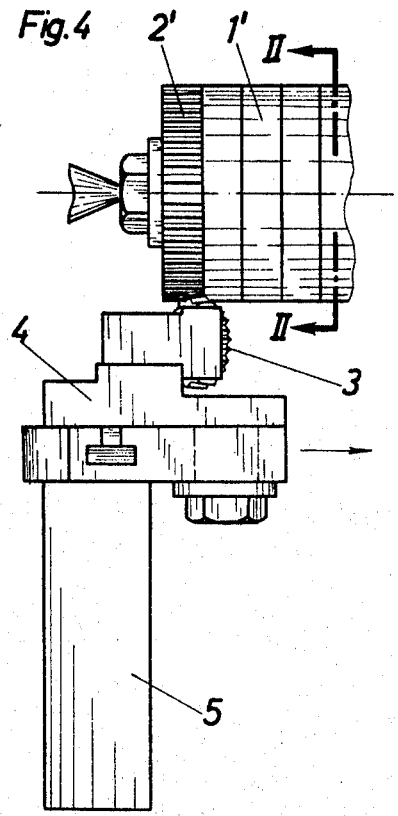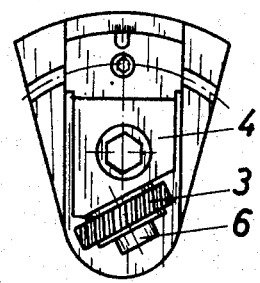

3,453,930
PROCESS FOR CUTTING GEAR TEETH ON THE SURFACE OF A CYLINDRICAL BLANK WORKPIECE
Hubert Ebenbichler, Eichatstrasse 48, Absam, Tyrol, Austria; Franz Pluhar, Rammersweier, Offenburg, Germany; and Johann Scharler, Hottingerau 33, Innsbruck, Austria
Filed Jan. 10, 1967, Ser. No. 608,434
Claims priority, application Germany, Jan. 11, 1966, P 38,515; Austria, Jan. 14, 1966, A 320/66, A 321/66
Int. Cl. B23f 1/06, 5/20
U.S. Cl. 90—2     5 Claims

ABSTRACT OF THE DISCLOSURE

A process for cutting gear teeth on a rotating blank cylindrical workpiece having a toothed guide member secured to one end thereof and feeding a rotatable toothed cutter meshed with said guide member longitudinally into the blank workpiece to cut new teeth thereon corresponding to the teeth of said guide member.

---

Figure 1:
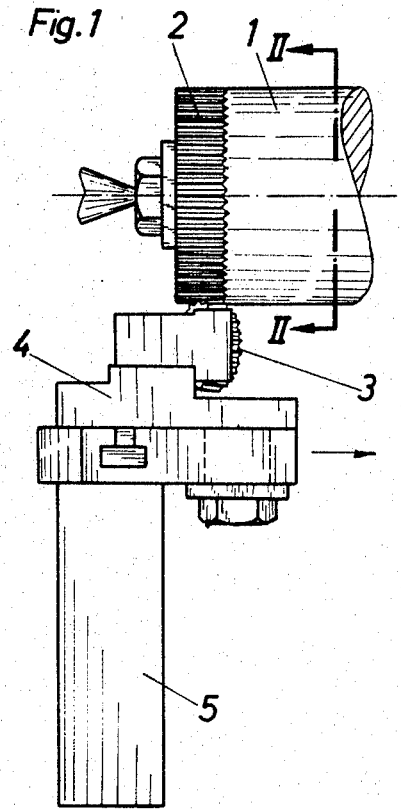

The invention relates to a process for cutting gear teeth on workpieces having cylindrical external or internal surfaces, by means of at least one cutting wheel having the form of a toothed gear, the teeth of which engage the workpiece to the required depth of mesh. The frontal cutting edges of the cutting wheel cut the required tooth upon rotation of the workpiece and upon relative advance between the cutting wheel and the workpiece in a direction parallel to the axis of the workpiece.

Such a process for the production of teeth, especially of milled edges, is known and is particularly characterized by great simplicity and high working speed. The working speeds are a great deal higher than those of the more usual teeth cutting methods, e.g. methods using generating milling cutters or gear shapers.

As to the simple teeth cutting process hereinbefore described, a certain difficulty lies in the keeping constant of a certain number of teeth and a regular pitch or division of the teeth on all similar blanks machined with the same tool. Said process has, therefore, hitherto been used particularly for the production of milled edges. The reason for this difficulty lies in the fact that in applying the tool to the blank to be cut, an exact guidance or positioning is difficult and an uncontrolled slip or displacement may appear between tool and blank, thus causing the shortcoming hereinbefore described.

It is an object of the present invention to eliminate this drawback by arranging for the cutting wheel or wheels to come into mesh with a toothed guide member fastened to or formed on the front end or side of the workpiece and having the required number of teeth and tooth direction, the tooth cutting on the workpiece being continued by mere rotation of the workpiece and by relative advance between the cutting wheel or wheels and the workpiece.

It is convenient to use as the guide member, a toothed piece having the exact number of teeth and a regular pitch or division of teeth, said toothed piece being produced on the workpiece itself by applying a hobbing or indexing method.

Alternatively a toothed guide member may be fastened at the front side or end of the workpiece, said guide member being a toothed gear which is not capable of rotating in relation to the workpiece and the crown line or tip circle diameter of which is at least approximately equal to the diameter of the workpiece surface to be cut.

Tooth cutting on the workpiece is obtained in such manner that the cutting wheel comes into mesh with the guide member, rolling-off the latter by rotation of the workpiece, the frontal cutting edges of the cutting wheel simultaneously cutting into the workpiece to the final depth of tooth by advancing (reciprocating) the cutting wheel in the direction of the workpiece axis. During cutting of the workpiece, the cutting wheel is directed by rolling-off the guide piece and is only capable of cutting the workpiece with the number of teeth determined by the guide piece and is caused to keep a regular pitch of the teeth.

Embodiments of the invention are hereinafter described in greater detail with reference to the accompanying drawings without being limited to them.

Figure 2:
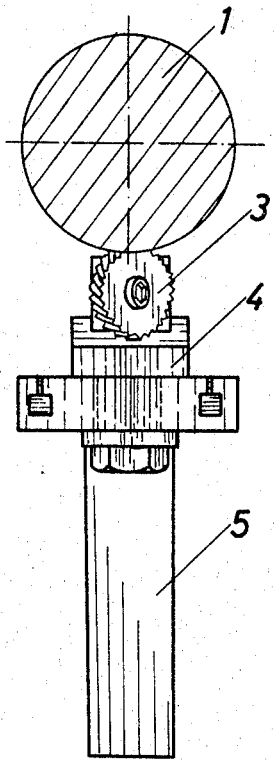
Figure 3:
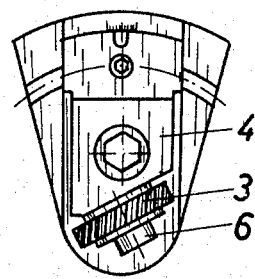

In the drawings:

FIGURE 1 is a side view of one embodiment, illustrating a cutting wheel in mesh with a guide member produced on the workpiece itself, FIGURE 2 is a section of FIGURE 1 along line II—II, FIGURE 3 is a top view of the tool holder and cutting wheel, FIGURE 4 is a side view of a second embodiment illustrating a cutting wheel in mesh with a guide toothed gear, FIGURE 5 is a section of FIGURE 4 along line II—II, and FIGURE 6 is a top view of the tool holder and cutting wheel shown in FIGURES 4 and 5.

In the embodiment according to FIGURES 1 to 3 a guide member 2 having a predetermined number of teeth and a regular pitch or division of teeth is produced on the frontal marginal zone of the cylindrical workpiece 1, to be cut, by an indexing method, every single tooth being individually cut by means of an indexing head, or by a hobbing method. The workpiece 1 is then set up on a turning lathe spindle and a cutting tool is clamped to the support of the turning lathe table in order to continue the teeth cutting operation. Said tool essentially consists of a cutting wheel 3 which is rotatably secured to the head 4 of a tool holder which has a shaft 5. The head 4 of the tool holder is rotatable about an axis running in the direction of the longitudinally extending shaft 5 and is capable of being fixed in any angular position.

When the production of teeth is continued by means of the cutting wheel 3, the latter comes into mesh with the guide member 2, the workpiece 1 is revolved around its axis and the tool holder is advanced in the direction of the arrow in FIGURE 1. Thus, guided by the guide member 2, the frontal cutting edges of the cutting wheel 3 enter the workpiece to the final depth of the teeth. The workpiece 1 to be cut is thereby given the same number of teeth as the guide piece 2 and a regular pitch or division of teeth.

In the embodiment according to FIGURES 4 to 6, a guide gear 2' is secured to the front side of the cylindrical workpiece 1' so that it is not capable of rotating in relation to the workpiece. The workpiece consists of several disc-shaped pieces coaxially fixed together so that they are not capable of rotating in relation to one another. The set of discs forming the workpiece 1' and the guide toothed gear 2' are clamped together and set on a turning lathe spindle.

The cutting wheel is is rotatably secured to the head 4 of a tool holder the shaft 5 of which is clamped to the tool support of a turning lathe as in the embodiment according to FIGURES 1 to 3. The head 4 of the tool holder is adjustable angularly about an axis running in the direction of the longitudinally extending shaft 5 and is capable of being fixed in any position of angular adjustment.

When the production of teeth on the workpiece 1' is continued, the cutting wheel 3 comes into mesh with the guide toothed gear 2', the workpiece 1' is revolved around its axis and the tool holder is advanced in the direction of the arrow in FIGURE 4. Thus, directed by the guide toothed gear 2', the frontal cutting edges of the cutting wheel 3 enter the workpiece to the final depth of the teeth and the workpiece 1' is cut with the same number of teeth as the guide toothed gear 2' and with a regular pitch or division of teeth.

If a cutting wheel 3 having slanting teeth is to cut teeth on the workpiece which are to extend parallel to the axis of the latter, the axis 6 of the cutting wheel 3 has to be set slantwise in relation to the axis of the workpiece in such manner that the teeth of the cutting wheel 3 run parallel to the axis of the workpiece. If the workpiece 1 or 1' is to be cut with slanting or helical teeth, this is obtained by horizontally swivelling the head 4 of the tool holder, thus swivelling the axis 6 of the cutting wheel, the direction of the teeth of the cutting wheel being in a slanting position in relation to the axis of the workpiece. In such a case the guide piece 2 or the guide toothed gear 2' must obviously be given correspondingly slanting teeth.

Apart from the relations described between the teeth of the cutting wheel, of the guide member and the further teeth to be given to the workpiece, it is necessary or preferable to observe other relations in the special forms of the teeth to be produced. Thus, the teeth of the guide member will correspond to the teeth to be produced, by means of the cutting wheel or wheels, not only as regards the number of teeth, but also as regards the tip circle diameter and the root circle diameter and, as the case may be, also as regards the diameter of the divided or pitch circle. The tooth profile and shape e.g. involute-tooth, cycloidal-tooth or simple serration may also correspond.

The cutting wheel and the guide member are constructed to mesh together correctly. With tooth systems having a divided or pitch circle defined, this is obtained by conformity as regards division or pitch (divided or pitch circle arc between two successive right and left flanks), which also implies conformity as regards the module, since there is the relation $t = m\pi$ between division or pitch $t$ and module $m$. Yet, whereas in this case the head room or depth of the teeth of the guide member ought to be equal to the module, the head room or depth of the teeth of the cutting wheel will be elongated or increased by the tip clearance in order to enable the cutting wheel to enter the workpiece at the root line depth or root circle of the guide member.

The cutting wheel teeth may have special forms at their side frontal edges, e.g. they may be relief-milled or slope-back-ground. As can be seen from the embodiments shown in the drawings, the cutting wheels need not necessarily be relief-milled at their frontal edges. In this case, however, it is necessary, as illustrated, to dispose the axis or front surface of the cutting wheel slantwise to the direction of the teeth to be produced.

The process according to the invention is not only applicable to the production of external teeth, but can also be applied to the production of internal teeth. In the latter case the guide piece will have the form of a ring with internal teeth.

The process of the invention applies to the production of teeth of any profile and to the production of straight or slanting teeth. In special cases it also applies to the production of crossing teeth systems on one workpiece in one single operation.

What we claim is:

1. A process for cutting gear teeth on the surface of a cyclindrical blank workpiece, said workpiece including a tooth guide member non-rotatably secured to one end thereof, said guide member being concentric to said workpiece and having the required number of teeth and the tooth formation desired on the blank workpiece, and a rotatable cutter, said cutter being in the form of a tooth gear having frontal cutting edges, said process including the steps of meshing said cutter gear teeth with said guide member teeth, orientating the front cutting edge of the cutter in a plane so as to be inclined to the axis of said guide member, rotating said workpiece and providing relative longitudinal advancement of said cutter into the blank workpiece thereby cutting new teeth on said workpiece corresponding to the tooth shape of said guide member.

2. The process according to claim 1 wherein said toothed guide member is produced on the workpiece itself by an indexing method.

3. The process according to claim 1 wherein said toothed guide member is produced on the workpiece itself by a hobbing method.

4. The process according to claim 1 wherein said toothed guide member has a tip circle diameter at least approximately equal to the diameter of the surface to be toothed.

5. The process according to claim 1 wherein said toothed guide member is formed as a gear non-rotatably secured to one end of the workpiece.

References Cited

UNITED STATES PATENTS

| | | | |
|---|---|---|---|
| 938,304 | 10/1909 | Dill | 90—7 |
| 2,336,760 | 12/1943 | Sykes | 90—7.5 |
| 2,585,261 | 2/1952 | Mentley | 90—1.6 |
| 3,125,931 | 3/1964 | Stanaback | 90—11.42 |

ANREW R. JUHASZ, *Primary Examiner.*

G. WEIDENFELD, *Assistant Examiner.*

U.S. Cl. X.R.

90—7